United States Patent [19]

West

[11] 4,007,504
[45] Feb. 15, 1977

[54] HIVE ENTRYWAY

[75] Inventor: Ernest Harry West, Cowaramup, Australia

[73] Assignees: Laura J. West; Allan A. West; Lionel B. West, all of Cowaramup; Kenneth H. West, Margaret River, all of Australia; part interest to each

[22] Filed: July 11, 1974

[21] Appl. No.: 487,732

[30] Foreign Application Priority Data

July 11, 1973  Australia .................. 58008/73

[52] U.S. Cl. .................................................. 6/4 R
[51] Int. Cl.² .................................... A01K 47/06
[58] Field of Search ............ 6/4 R, 4 A, 4 B, 12 M, 6/1

[56] References Cited
UNITED STATES PATENTS

| | | | |
|---|---|---|---|
| 33,704 | 11/1861 | Hazen | 6/4 R |
| 37,039 | 12/1862 | Gunn et al. | 6/4 R |
| 45,657 | 12/1864 | Vanduzer | 6/4 R |
| 93,009 | 7/1869 | Robinson | 6/4 R |
| 127,479 | 6/1872 | Greer | 6/4 R |
| 128,070 | 6/1872 | Roberts | 6/4 R |
| 470,789 | 3/1892 | Matthew | 6/4 R |
| 499,490 | 6/1893 | Wismer | 6/4 A |
| 1,243,555 | 10/1917 | Reisinger | 6/4 R |
| 1,370,775 | 3/1921 | Bacon | 6/4 R |
| 1,491,213 | 4/1924 | Troilo | 6/4 R |

FOREIGN PATENTS OR APPLICATIONS 1,223,455  6/1960  France .......................... 6/12 M Primary Examiner—Hugh R. Chamblee
Attorney, Agent, or Firm—Christie, Parker & Hale

[57] ABSTRACT

A bee hive having a body having an interior which is open to access by bees via a hive entryway, said entryway having means for removably retaining a control element for control of bee activity in the entryway. The hive entryway includes an outside opening and an upright side wall of the hive body, an entry passage leading to the interior of the hive body from the outside opening, and an inside opening located immediately above the entry passage and facing upwardly into the interior of the hive body. Support means in the entry passage removably mount a bee control element across the inside opening immediately inboard the upright side wall of the hive body. A container is located below the entry passage to receive pollen falling in the passage from the inside opening in response to bees passing through the control element.

11 Claims, 6 Drawing Figures

HIVE ENTRYWAY

BACKGROUND OF THE INVENTION i. Field of the Invention

This invention relates to entryways for bee hives.

ii. Prior Art

Bee hives are customarily formed of a base board which supports a hive body. The hive body usually comprises a square box-like structure with open upper and lower walls and may be formed of a plurality of vertically stacked "supers" each having four side walls arranged in rectangular configuration when viewed in plan. The top of the hive body is normally closed by a lid, and entry into the interior of the hive body is through an opening at the lower part of the bee hive. This opening might, for example, comprise a horizontal elongate opening formed between the lower edge of one wall of one of the supers and the base board itself.

BRIEF DESCRIPTION OF THE INVENTION

This invention provides modified entryway arrangements permitting ready adaptation to perform various functions in the control of bee activities.

More particularly, in one of its aspects, the invention provides, a bee hive of the kind having a body having an interior which is open to access by bees via a hive entryway, said entryway having associated therewith means for removably retaining a control element for control of bee activity at the entryway. Said hive body may be closed, at a lower end thereof, by a hive floor, and said entryway may then include a first opening in said floor, said means for removably retaining being mounted at said floor for positioning of said control element across said first opening. Preferably, said control element is planar and said means for removably retaining mounts the control element in horizontal disposition. The entryway may further include a second opening open to an upright side of the bee hive, said second opening being positioned to allow bee entry to the hive first through said second opening and then through said first opening. Means may be provided for supporting said floor in elevated position when the hive is placed on a ground surface, said second opening being at a lower disposition than said first opening and opening to a cavity below the said first opening. Said cavity may be defined between a pair of generally parallel support elements comprising said means for supporting and positioned under said floor. The said second opening may extend through or above one of said support elements. Said cavity may be open at least to the underside thereof and to at least one upright end portion thereof to permit ventilation of the hive interior by allowing air flow from the exterior of the hive through said cavity and thence through said first opening, at least when said control element is not positioned across the first opening. Said means for removably retaining may comprise slide means to slidably receive and retain the control element, and said slide means may open to said second opening whereby said control element may be positioned across said first opening by inserting it through said second opening.

Said control element may comprise a screen having apertures thereof of sufficient size to allow bees to pass therethrough, but so arranged that, when it is positioned across said first opening, a desired proportion of pollen collected by bees returning to the hive interior through the screen is scraped from the bees by engagement with sides of said apertures as the bees pass therethrough. The hive arrangement is preferably such that such scraped off pollen falls into said cavity, and a suitable collection container may be provided to receive it. The control element may also comprise a screen having apertures therein which are sufficient to provide ventilation into the interior of the hive body, but which are such as not to permit bees to leave the hive via said entryway when the control element is positioned at the entryway. This control element can be used to prevent bees from flying to leave the hive, such as during transport of the bee hive, whilst ensuring that the bees do not suffer through lack of proper ventilation to the hive as would occur if the opening were completely closed. The control element may also comprise means which, when fitted across said first opening, provides a restricted entrance for bees into the hive. Where said second opening is provided, the control element in this case may provide, in co-operation with other defining walls of the said cavity, a substantially closed duct extending between said first and second openings.

In a preferred construction, the entryway is formed in a base board for the hive, and in a further aspect of the invention there is provided a base board for use in supporting thereon a bee hive body and in which the said entryway is at least partly defined.

BRIEF DESCRIPTION OF THE SEVERAL VIEWS OF THE ACCOMPANYING DRAWINGS

The invention is further described with reference to the accompanying drawings in which.

DETAILED DESCRIPTION

Figure 1:
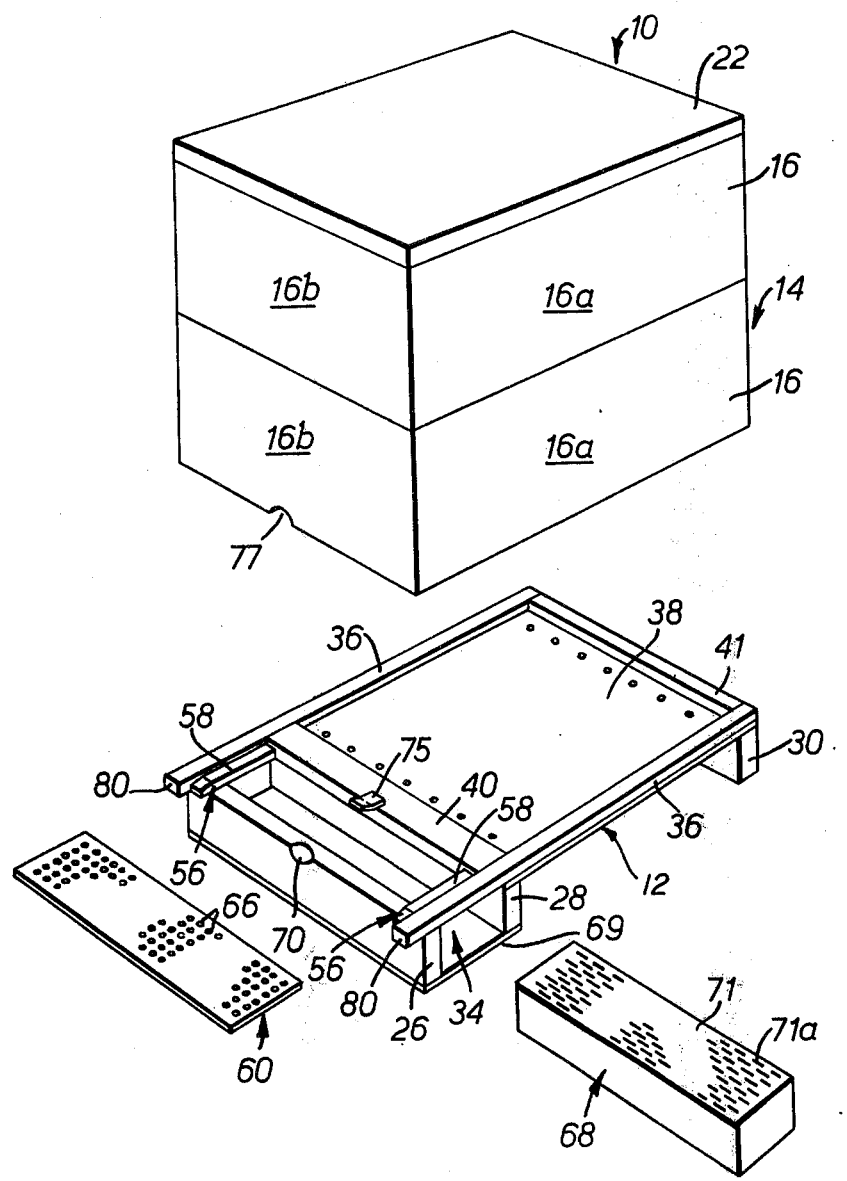
FIG. 1 is an exploded perspective view of a bee hive constructed in accordance with the invention.

The hive 10 shown includes a base board 12 which supports a hive body 14. Hive body 14 comprises one or more supers 16, two such supers being illustrated, one being positioned above the other. Each super 16 comprises an open bottomed and open topped rectangular box defined simply by two upright opposed side walls 16a and two interconnecting opposed side walls 16b. The supers retain, in hanging disposition therein, a plurality of rectangular frames 18. These frames, which support the honeycomb of the bee colony using the hive, are supported at upper edges thereof by engagement of side projections thereon in rebates 20 on the opposed side walls 16b of the supers 16. The top of the hive is closed by a lid 22 which rests upon the upper super 16. The lower peripheral edge 24 of the lowermost super 16 rests upon base board 12.

Figure 2:
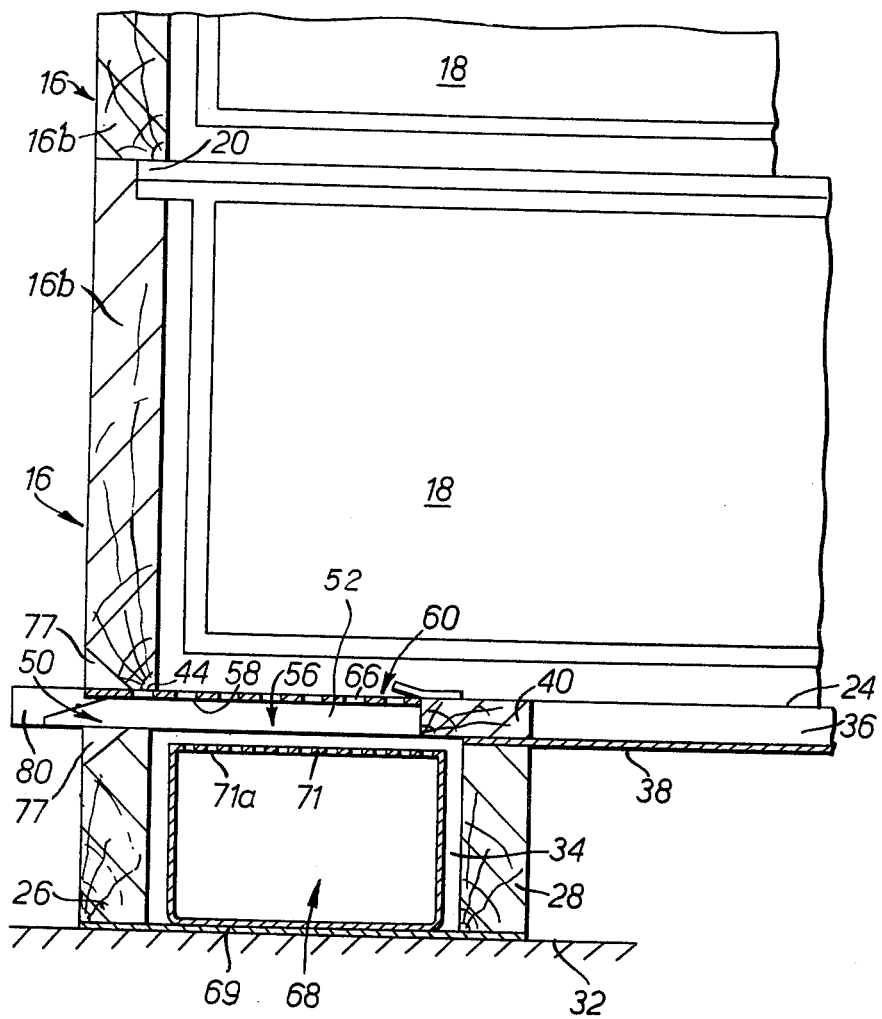
FIG. 2 is a fragmentary vertical and lengthwise cross-section of the lower front portion of the bee hive of FIG. 1.

Base board 12 includes three transversely extending cleats 26, 28 and 30 for supporting the base board 12 on a ground surface 32. Base board 12 is generally rectangular in form having side edges generally aligned with the directions of extent of the peripheral walls 16a, 16b of supers 16. Cleats 26 and 30 are disposed adjacent front and rear edges of the base board, and cleat 28 is relatively closely spaced from cleat 26 so that a cavity 34, for a purpose hereinafter described, is defined between cleats 26 and 28 and at the front of the hive. A rectangular metal plate 38 rests on and is secured, at front and rear edges thereof, to the cleats 28 and 30. This extends from side to side of base board 12, and marginal side edges of the plate 38 are secured to the underside of a pair of side edge members 36 disposed one to either side of base board 12. Members 36 extend from rear ends thereof, which are positioned above cleat 30 and secured thereto as by nailing, forwardly over cleat 28, to which they are also secured to as by nailing, and thence to forward ends which are positioned above and secured to cleat 26 as by nailing. Two transverse frame members 40, 41 are positioned above and extend along front and rear marginal edges of plate 38. These are secured to cleats 28 and 30, as by nailing, and extend from side to side of base board 12 between members 36. These are of the same height as members 36. Members 36 and 41 support the lower edge 24 of the lower super 16. As best appreciated from FIGS. 1 and 2, the lower peripheral edge of the lowest super 16 is supported at back and side portions thereof by members 41 and 36, but the forward portion 44 is unsupported and extends in spaced disposition above cleat 26 so that a horizontally elongate outside opening 50 is defined between forward edge portion 44 and the cleat 26.

The forward edge of member 40 is spaced rearwardly some two or three inches from portion 44 so that, although most of the floor of the base board is closed by plate 38, there is thus defined an inside opening 52 in the floor. This opening is bounded at opposite sides by inner surfaces of members 36, at its front by the rear of portion 44 and at its rear by the forward edge of member 40.

It will be seen that opening 50 to the front of the hive communicates with an upper forward portion of cavity 34, whilst opening 52 communicates with the upper part of the cavity at a disposition immediately behind opening 50. Additionally, the cavity 34 is open at opposed transverse sides of the base board 12. The openings 50, 52 together with the cavity 34 and the side openings thereto define an entryway to the interior of the hive. Although bees can enter the hive via the side openings, thence to cavity 34 and through opening 52, in general, they will enter via opening 50, cavity 34 and opening 52.

A pair of side guide elements 56 are provided in the entryway. These are secured one to each of the members 36 on facing inner surfaces thereof. These are of elongate configuration and extend rearwardly from dispositions adjacent forward ends of the members 36 to dispositions adjacent member 40. Each has an upper horizontal surface 58 which is spaced immediately below the portion 44 of lower peripheral edge 24.

Figure 3:
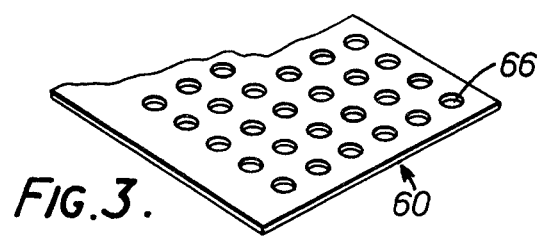
FIG. 3 is a fragmentary perspective view of portion of a control element incorporated into the bee hive of FIG. 1.
Figure 4:
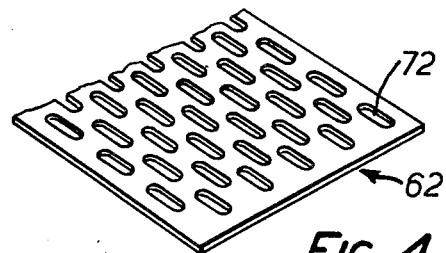
FIG. 4 is a fragmentary perspective view of portion of an alternate control member.
Figure 5:
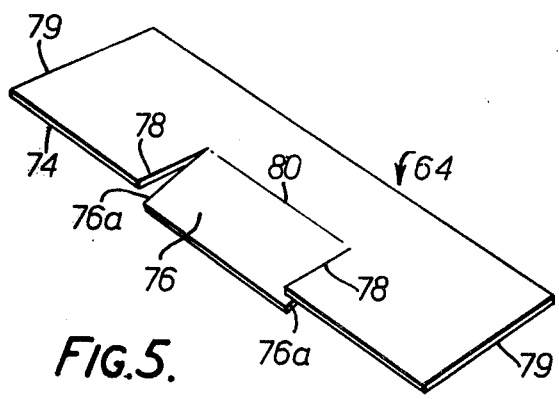
FIG. 5 is a perspective view of a further form of control element.

Three hive control elements 60, 62 and 64 are provided (FIGS. 3, 4 and 5). These are each of planar rectangular configuration and any one of them may be positioned to cover opening 52 by sliding it, in horizontal disposition, through the upper part of opening 50, from the front of the hive, so that side marginal edges thereof rest on the upper surfaces 58 of the guide elements 56 and pass between surface portion 44 and these. A control element can be so positioned that the rear edge thereof abuts against member 40, as illustrated by the element 60 in FIG. 3, whilst a forward marginal portion is positioned below edge portion 44, so that when a control element is so positioned, access to the interior of the hive can only be achieved if passage through the control element can be effected. The rear edge of the control element is received under a forwardly projecting locating lug 75 to locate the edge and prevent upward bowing thereof. The upper part of cleat 26 and the lower part of lowest super 16 have corresponding cut-outs 77 to allow easy grasping of the front edge of the control element to effect withdrawal thereof. Control element 60 (shown in place in FIG. 2) is in the form of a perforate screen having numerous circular openings 66 of diameter 3/16 inch. When it is in position, bees entering the hive via opening 52 must pass through these openings 66. Their diameter is such that honey bees cannot carry a full load of pollen through them and consequently pollen is scraped from the bees as they pass into the hives, the pollen falling into cavity 34 where it may be collected by, for example, a suitable elongate open topped receptacle 68. Receptacle 68 can be slid inwardly of the cavity from either open side of the cavity and a transverse floor plate 69 is provided bridging the undersides of cleats 26 and 28 to support the receptacle. The receptacle is covered, at the top thereof, by a removable screen 71. This has a number of openings 71a therein, these openings being of dimension $\frac{3}{4} \times \frac{1}{8}$ inch, this being sufficient to prevent access by bees into the receptacle so that pollen falling into the receptacle cannot be retrieved by the bees.

Control element 62 is also in the form of a screen this having numerous openings 72 of dimension $\frac{3}{4} \times \frac{1}{8}$ inch. When this is positioned across opening 52, bees can be retained within the hive to prevent migration thereof. It will be observed that because of the comparatively large size of opening 52, when element 62 is positioned thereacross, good ventilation in to the interior of the hive is achieved. This is of particular importance during transportation of hives where restricted ventilation may cause death of bees in the hive.

Figure 6:
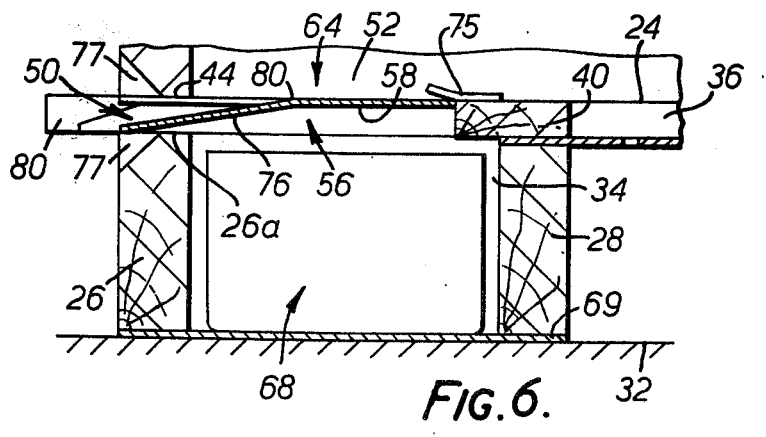
FIG. 6 is a view corresponding to portion of FIG. 2 but showing the manner of positioning the control element of FIG. 5 in the bee hive.

Element 64 (shown in place in FIG. 6) is formed of plane sheet metal, and thus when positioned across opening 52, substantially closes off the opening. However, a portion 76 thereof adjacent the front edge 74 is formed so as to allow some access to the hive. Portion 76 is formed by making two parallel cuts 78 to extend a short distance inwardly of edge 74 at locations well spaced inwardly from the side edges 79 of the element. Portion 76, which is defined between these cuts is then bent downwardly along a bend 80 extending transversely between the points of innermost extent of the cuts to form a downwardly sloping ramp. This is so arranged that a forward edge thereof rests against the upper surface 26a of cleat 26 (FIG. 6) when the element is positioned across opening 52. Thus, although the element 64 will substantially block the opening 52, limited access from opening 50 up along the ramp provided by portion 76 to the interior of the hive can be achieved. There are also small side openings between the side edges 76a of portion 76 and the remainder of element 64, and these provide a small degree of access from cavity 34. The control element 64 is useful where a colony of bees occupying the hive 10 is weak, in numbers or otherwise, and where it would be difficult for bees of the hive to adequately police the large opening 52 to prevent intruders from entering. The relatively restricted opening provides a relatively small area which needs to be policed, and this can be much more effectively covered by even a "weak" bee colony.

It will be appreciated that the described construction is particularly advantageous in that it can readily be adapted to provide for various bee control purposes as described. The particular facility with which pollen can be collected by the use of the screen 60 is also advantageous, as this is a product of increasing commercial importance. The pollen may be used either for direct sale, or can be stored for subsequent feeding to bees in times when natural food supplies are scarce, for example during winter. Aside from this benefit, the provision for control of pollen entry into the hive performs the additional function that, in times when pollen is plentiful and might be collected in too profuse quantities by the bees, the tendency of bees to swarm under these conditions is minimised so that loss of valuable bee colonies from the hive can at least be substantially avoided. The advantages in avoiding loss of valuable bees during transportation, as provided by the use of the element 62, is particularly important. The improved ventilation provided by this arrangement is further enhanced, in the described construction, by forwardly extending members 36 so that forward projections 80 are provided. These projections ensure that hives cannot be positioned, during transportation, with upright surfaces of adjacent base boards 12 blocking the opening 50.

The described bee hive utilises a hive body 14 of conventional configuration, but it will be appreciated that other forms could be used. Again, whilst the entryway is incorporated into the base board 12, this is not essential, and other arrangements, such as ones in which the base board 12 is secured to the hive body are possible.

These and many other modifications may be made to the described construction without departing from the spirit and scope of the invention as defined in the appended claims.

I claim:

1. A bee hive comprising:
   a. a hive body having an interior open to access by bees via a hive entryway;
   b. a hive floor closing a lower end of the hive body;
   c. means forming an inside opening in the hive floor;
   d. slide means mounted at the floor for slidably receiving and retaining a generally planar control element in a generally horizontal position for controlling bee activity at the entryway;
   e. means forming an outside opening in an upright side wall of the hive body, the outside opening being positioned to allow bee entry to the hive interior first through the outside opening and then through the inside opening, the outside opening being at a lower elevation than the inside opening and being open to a cavity below the inside opening, the slide means being open to the outside opening so that the control element may be positioned across the inside opening by inserting it through the outside opening; and
   f. a pair of generally parallel support elements at least one of which support said floor in an elevated position when the hive is placed on a ground surface, the cavity being defined between the pair of support elements.

2. A bee hive according to claim 1 in which the outside opening is positioned at the top of one of the support elements.

3. A bee hive according to claim 1 in which the cavity is open at least to the underside of the hive interior and to at least one upright end portion of the hive to permit ventilation of the hive interior by allowing air flow from the exterior of the hive through the cavity and then through the inside opening, at least when the control element is not positioned across the inside opening.

4. A bee hive according to claim 1 in which the slide means removably retains the control element so it covers the inside opening, the control element having numerous apertures therein dimensioned to allow bees to pass into the hive therethrough, but to remove at least a substantial portion of pollen carried by entering bees.

5. A bee hive according to claim 1 in which the slide means removably retains the control element so it covers the inside opening, the control element having numerous elongate apertures therein having maximum transverse dimensions preventing bees from leaving the hive.

6. A bee hive according to claim 1 in which the slide means removably retains the control element so it covers the inside opening, the control element being structured to effectively reduce the size of the entryway for the bees into the hive interior.

7. A bee hive according to claim 1 in which the inside opening is located in the floor immediately inboard the upright side wall; and in which the slide means includes means for holding the bee activity control element in a position extending from immediately inboard the upright side wall across the inside opening so that bees may reach the interior of the hive body by passing through the outside opening and then substantially immediately upwardly through the control element and the inside opening.

8. A base board for supporting a hive body of a bee hive, said base board defining, at least when the hive body is positioned on the base board, an entryway through which bees may enter the interior of the hive body, said entryway comprising:
   a. an inside opening in a floor of said base board;
   b. slide means mounted at said floor for slidably receiving and retaining a generally planar control element in a generally horizontal position for controlling bee activity at the entryway;
   c. said entryway further including a portion defining, at least when a hive body is in place on the base board, an outside opening in an upright side of the base board, the outside opening being positioned to allow bee entry through the outside opening and then through the inside opening, the outside opening being at a lower elevation than the inside opening and being open to a cavity below the inside opening, the slide means being open to the outside opening so the control element can be positioned across the inside opening by inserting it through the outside opening; and
   d. a pair of generally parallel support members at least one of which supports the floor in an elevated position when the base board is in place on a ground surface, the cavity being defined between the pair of support elements.

9. A base board according to claim 8 in which the outside opening is positioned at the top of one of the support elements.

10. A base board according to claim 8 in which the cavity is open upwardly and to at least one upright end portion of the base board to permit ventilation to the interior of the hive body, when the hive body is mounted on the base board, by allowing air flow from the exterior of the base board through the cavity and then through the inside opening, at least when the control element is not positioned across the inside opening.

11. A base board according to claim 9 in which the inside opening is located in the floor immediately inboard the upright side wall; and in which the slide means includes means for holding the bee activity control element in a position extending immediately inboard the upright side wall across the inside opening so that bees may reach the interior of the hive body by passing through the outside opening and then substantially immediately upwardly through the control element and the inside opening.

* * * * *